(12) United States Patent
Glover et al.

(10) Patent No.: US 7,165,024 B2
(45) Date of Patent: Jan. 16, 2007

(54) INFERRING HIERARCHICAL DESCRIPTIONS OF A SET OF DOCUMENTS

(75) Inventors: Eric J. Glover, North Brunswick, NJ (US); Stephen R. Lawrence, New York, NY (US); David M. Pennock, Monroe Township, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 739 days.

(21) Appl. No.: 10/209,594

(22) Filed: Jul. 31, 2002

(65) Prior Publication Data

US 2003/0167163 A1     Sep. 4, 2003

Related U.S. Application Data

(60) Provisional application No. 60/367,309, filed on Mar. 25, 2002, provisional application No. 60/359,197, filed on Feb. 22, 2002.

(51) Int. Cl.
*G06F 17/27* (2006.01)

(52) U.S. Cl. ......................................................... 704/9
(58) Field of Classification Search ..................... 704/9
See application file for complete search history.

(56) References Cited

U.S. PATENT DOCUMENTS

| | | | | |
|---|---|---|---|---|
| 5,819,258 A | * | 10/1998 | Vaithyanathan et al. | 707/5 |
| 5,857,179 A | * | 1/1999 | Vaithyanathan et al. | 707/2 |
| 5,995,095 A | * | 11/1999 | Ratakonda | 715/500.1 |
| 6,055,540 A | * | 4/2000 | Snow et al. | 707/103 R |
| 6,078,913 A | * | 6/2000 | Aoki et al. | 707/2 |
| 6,100,901 A | * | 8/2000 | Mohda et al. | 345/440 |

(Continued)

OTHER PUBLICATIONS

Modha et al. "Clustering hypertext with applications to web searching," 2000, Proceedings of the 11th ACM on Hypertext and hypermedia, pp. 143-152.*

(Continued)

*Primary Examiner*—Tālivaldis Ivars Šmits
*Assistant Examiner*—Eunice Ng (57) ABSTRACT

A method automatically determines groups of words or phrases that are descriptive names of a small set of documents, as well as infers concepts in the small set of documents that are more general and more specific than the descriptive names, without any prior knowledge of the hierarchy or the concepts, in a language independent manner. The descriptive names and the concepts may not even be explicitly contained in the documents. The primary application of the invention is for searching of the World Wide Web, but the invention is not limited solely to use with the World Wide Web and may be applied to any set of documents. Classes of features are identified in order to promote understanding of a set of documents. Preferably, there are three classes of features. "Self" features or terms describe the cluster as a whole. "Parent" features or terms describe more general concepts. "Child" features or terms describe specializations of the cluster. The self features can be used as a recommended name for a cluster, while parents and children can be used to place the clusters in the space of a larger collection. Parent features suggest a more general concept, while children features suggest concepts that describe a specialization of the self feature(s). Automatic discovery of parent, self and child features is useful for several purposes including automatic labeling of web directories and improving information retrieval.

72 Claims, 6 Drawing Sheets

U.S. PATENT DOCUMENTS

| | | | |
|---|---|---|---|
| 6,430,558 B1* | 8/2002 | Delano | 707/5 |
| 6,473,095 B1* | 10/2002 | Martino et al. | 715/726 |
| 6,480,843 B1* | 11/2002 | Li | 707/5 |
| 6,598,043 B1* | 7/2003 | Baclawski | 707/3 |
| 6,799,176 B1* | 9/2004 | Page | 707/5 |
| 6,925,460 B1* | 8/2005 | Kummamuru et al. | 707/3 |
| 6,931,595 B1* | 8/2005 | Pan et al. | 715/723 |
| 2002/0065857 A1* | 5/2002 | Michalewicz et al. | 707/532 |
| 2002/0099702 A1* | 7/2002 | Oddo | 707/6 |
| 2002/0165860 A1* | 11/2002 | Glover et al. | 707/5 |
| 2002/0178136 A1* | 11/2002 | Sundaresan et al. | 707/1 |
| 2003/0221163 A1* | 11/2003 | Glover et al. | 715/501.1 |
| 2004/0111438 A1* | 6/2004 | Chitrapura et al. | 707/200 |
| 2005/0114130 A1* | 5/2005 | Java et al. | 704/240 |
| 2006/0110063 A1* | 5/2006 | Weiss | 382/262 |

OTHER PUBLICATIONS

Gelbukh, et al. "A Method of Describing Document Contents through Topic Selection," Sep. 22-24, 1999, String Processing and Information Retrieval Symposium, International Workshop on Groupware, pp. 73-80.*

Zhu et al. "PageCluster: Mining conceptual link hierarchies from Web log files for adaptive Web site navigation," May 2004, ACM Transactions on Internet Technology, ACM Press, vol. 4, Issue 2, pp. 185-208.*

Chuang et al. "A practical web-based approach to generatig topic hierarchy for text segments," 2004, Proceedings of the thirteenth ACM International conference on information and knowledge management, ACM Press, pp. 127-136.*

Gaussier et al. "A hierarchical model for clustering and categorising documents," 2002, Advances in Information Retrieval, Proceedings of the 24th BCS-IRSG European Colloquium on IR Research, pp. 229-247.*

Lee et al. "Hierarchical video indexing and retrieval for subband-coded video," Aug. 2000, IEEE Transactions on Circuits and Systems for Video Technology, vol. 10, Issue 5, pp. 824-829.*

Weiss et al. "HyPursuit: a hierarchical network search engine that exploits content-link hypertext clustering," 1996, Proceedings of the 17th ACM conference on Hypertext, pp. 180-193.*

Wan et al. "A new approach to image retrieval with hierarchical color clustering," Sep. 1998, IEEE Transactions on Circuits and Systems for Video Technology, vol. 8, Issue 5, pp. 628-643.*

Mighlani et al. "Intelligent hierarchical layout segmentation of document images on the basis of colour content," Dec. 2-4, 1997, Proceedings of IEEE Speech and Image Technologies for Computing and Telecommunications, vol. 1, pp. 191-194.*

Rosario et al. "The Descent of Hierarchy, and Selection in Relational Semantics", Proceedings of the 40th Annual Meeting of the ACL, published 2001, pp. 247-254.*

Botafogo, et al. "Structural Analysis of Hypertexts: Identifying Hierarchies and Useful Metrics", ACM Transactions on Information Systems (TOIS), ACM Press, vol. 10, Issue 2, Apr. 1992, pp. 142-180.*

Caraballo, S.A., "Automatic Construction of a Hypernym-Labeled Noun Hierarchy from Text," In Proceedings of the 37th Annual Meeting of the Association for Computation Linguistics (1999).

Fasulo, D., "An Analysis of Recent Work on Clustering Algorithms," Technical Report, University of Washington (1999).

Glover, E.J. et al., "Using Web Structure for Classifying and Describing Web Pages," In Proceedings of the 11th WWW Conference, Hawaii (2002).

Hearst, M.A., "Automatic Acquisition of Hyponyms from Large Text Corpora," In Proceedings of the Fourteenth International Conference on Computational Linguistics, Nantes, France (Jul. 1992).

Hearst, M.A., "Automated Discovery of WordNet Relations," In Christine Fellbaum, editor, Wordnet: An Electronic Lexcial Database, MIT Press (1998).

Hofmann, T. et al., "Statistical Models for Co-Occurence Data," Technical Report Massachusetts Institute of Technology, Artificial Intelligence Laboratory (Feb. 1998).

Kumar, R. et al., "Trawling the Web for Emerging Cyber-Communities," WWW8/Computer Networks, 31 (1999).

Popescul, A. et al., "Automatic Labeling of Document Clusters," Unpublished manuscript, available at: http://citeseer.nj.nec.com/popescul00automatic.html.

Radev, D.R. et al., "Automatic Summarization of Search Engine Hit Lists," In Proceedings of ACL'2000 Workshop on Recent Advanced in Natural Language Processing and Information Retrieval, Hong Kong, PRC (2000).

Sanderson, M. et al., "Deriving Concept Hierarchies from Text," In Research and Development in Information Retrieval (1999).

* cited by examiner

INFERRING HIERARCHICAL DESCRIPTIONS OF A SET OF DOCUMENTS

CROSS REFERENCE TO RELATED APPLICATIONS

This application claims the benefit under 35 U.S.C. § 619(e) of U.S. Provisional Application Ser. No. 60/359,197, filed Feb. 22, 2002 and U.S. Provisional Application Ser. No. 60/367,309, filed Mar. 25, 2002. The full disclosures of the applications are hereby incorporated by reference for all purposes.

FIELD OF THE INVENTION

The present invention relates to searching of the World Wide Web and specifically relates to inferring hierarchical relationships about a topic from a small set of retrieved web pages, without prior knowledge of any hierarchical information.

The present invention further relates to automatically determining groups of words or phrases that are descriptive names of a small set of documents, as well as inferring concepts in the set of documents that are more general and more specific than the descriptive names, without any prior knowledge of the concepts. The descriptive name and the concepts may not even be contained in the documents. The primary application of the invention is for searching of the World Wide Web, but the invention is not limited solely to use with the World Wide Web or any particular information retrieval system and may be applied to any set of documents.

BACKGROUND OF THE INVENTION

Rapid growth of the World Wide Web has caused an explosion of research aimed at facilitating retrieval, browsing and organization of on-line text documents. Much of this work was directed towards clustering documents into meaningful groups. Often, given a set or hierarchy of document clusters, a user would prefer to quickly browse through the collection to identify clusters without examining particular documents in detail.

The World Wide Web contains a large number of communities of related documents, such as the biology community, or the community of ISP homepages. The present invention is a method for automatically inferring useful hierarchical information about any single community in isolation.

Starting with a set of documents, it is desirable to automatically infer various useful pieces of information about the set. The information might include a descriptive name or a related concept (sometimes not explicitly contained in the documents). Such information has utility for searching or analysis purposes.

Clustering may be defined as the process of organizing objects into groups whose members are similar in some way. There are two major styles of clustering: "partitioning" (often called k-clustering), in which every object is assigned to exactly one group, and "hierarchical clustering", in which each group of size greater than one may in turn be composed of smaller groups. The advent of World Wide Web search engines and specifically, the problem of organizing the large amount of data available, and the concept of "data mining" massive databases has led to renewed interest in clustering algorithms.

The present invention provides a method that identifies meaningful classes of features in order to promote understanding of a set or cluster of documents. Preferably, there are three classes of features. "Self" features or terms describe the cluster as a whole. "Parent" features or terms describe more general concepts. "Child" features or terms describe specializations of the cluster. For example, given a set of biology documents, a parent term may be science, a self term may be biology, and a child term may be genetics.

The self features can be used as a recommended name for a cluster, while parents and children can be used to place the clusters in the space of a larger collection. Parent features suggest a more general concept, while child features suggest concepts that describe a specialization of the self feature(s).

Automatic discovery of parent, self and child features can be useful for several purposes including automatic labeling of web directories or improving information retrieval. Another important use is automatically naming generated clusters, as well as recommending both more general and more specific concepts contained in the clusters, using only the summary statistics of a single cluster and background collection statistics.

Currently, popular web directories such as Yahoo (http://www.yahoo.com/) or the Open Directory (http://www.dmoz.org/) are human generated and human maintained. Even when categories are defined by humans, automatic hierarchical descriptions can be useful to recommend new parent or child links, or alternative names. The same technology can be useful to improve information retrieval by recommending alternative queries (both more general and more specific queries) based on a retrieved set of documents or pages.

There is a body of previous work related to automatic summarization. For example, Radev and Fan in "Automatic summarization of search engine hit lists", in *Proceedings of ACL '2000 Workshop on Recent Advances in Natural Language Processing and Information Retrieval*, Hong Kong, P. R. China, 2000, describe a technique for summarization of a cluster of web documents. Their technique parses the documents into individual sentences and identifies themes or "the most salient passages from the selected documents." This technique uses "centroid-based summarization" and does not produce sets of hierarchically related features or discover words or phrases not in the cluster.

Lexical techniques have been applied to infer various concept relations from text, see, for example, Marti A. Hearst in "Automatic acquisition of hyponyms from large text corpora", in *Proceedings of the Fourteenth International Conference on Computational Linguistics*, Nantes, France (1992); Marti A. Hearst in "Automated discovery in wordnet relations" in the book edited by Christiane Fellbaum, WordNet: An Electronical Lexical Database, MIT Press (1998) and Sharon A. Carballo in "Automatic construction of a hypernym-labeled noun hierarchy from text", in *Proceedings of the 37th Annual Meeting of the Association for Computational Linguistics* (1999). Hearst describes a method for finding lexical relations by identifying a set of lexicosyntactic patterns, such as a comma separated list of noun phrases, e.g. "bruises, wounds, broken bones or other injuries." These patterns are used to suggest types of lexical relationships, for example bruises, wounds and broken bones are all types of injuries. Carabalo describes a technique for automatically constructing a hypernym-labeled noun hierarchy. A hypernym describes a relationship between word A and B if "native speakers of English accept the sentence 'B is a (kind of) A'." Linguistics relationships such as those described by Hearst and Caraballo are useful for generating thesauri, but do not necessarily describe the relationship of a cluster of documents to the rest of a collection. Knowing that "baseball is a sport" may be useful if you knew a given cluster was focused on sports. However, the extracted relationships do not necessarily relate to the actual frequency of the concepts in the set. If there is a cluster of sports documents that discusses primarily basketball and hockey, the fact that baseball is also a sport is not as important for describing that set.

Sanderson and Croft in "Deriving concept hierarchies from text", in *Research and Development in Information Retrieval*" pages 206–213 (1999) presented a statistical technique based on subsumption relations. In their model, for two terms x and y, x is said to subsume y if the probability of x given y, is 1, and the probability of y given x is less than 1. In the actual model the probability used was 0.8 to reduce noise. A subsumption relationship is suggestive of a parent-child relationship (in the present invention a self-child relationship). This allows a hierarchy to be created in the context of a given cluster. In contrast, the present invention focuses on specific general regions of features identified as "parents" (more general than the common theme), "selfs" (features that define or describe the cluster as a whole) and "children" (features that describe the common sub-concepts).

Popescul and Ungar in "Automatic labeling of document clusters", an unpublished manuscript available at http://citeseer.nj.nec.com/popsecu100automatic.html, describe a simple statistical technique using $\chi^2$ for automatically labeling document clusters. Each (stemmed) feature was assigned a score based on the product of local frequency and predictiveness. The concept of a good cluster label is similar to the present notion of "self features". A good self feature is one that is both common in the positive set and rare in the negative set, which corresponds to high local frequency and a high predictiveness. In contrast to their work, the present invention considers features that may not be good names, but which promote understanding of a cluster (the parent and child features).

Eric J. Glover et al. in "Using web structure for classifying and describing web pages" in *Proceedings of the 11th WWW Conference*, Hawaii (2002) describe how ranking features by expected entropy loss can be used to identify good candidates for self names or parent or child concepts. Features that are common in the positive set, and rare in the negative set make good selfs and children, and also demonstrate high expected entropy loss. Parents are also relatively rare in the negative set, and common in the positive set, and are also likely to have high expected entropy loss. The present invention focuses on separating out the different classes of features by considering the specific positive and negative frequencies, as opposed to ranking by a single entropy-based measure.

Another approach to analyzing a single cluster is to divide the cluster into sub-clusters to form a hierarchy of clusters. D. Fasulo in "An analysis of recent work on clustering algorithms", Technical Report, University of Washington, (1999) available at http://citeseer.nj.nec.com/fasulo99analysi.html provides a summary of a variety of techniques for clustering (and hierarchical clustering) of documents. Kumar et al. in "Trawling the web for emerging cyber-communities" WWW8/*Computer Networks*, 31 (11–16): 1481–1493 (1999) describe specifically analyzing the web for communities, using the link structure of the web to determine the clusters. Hofmann and Puzicha in "Statistical models for co-occurrence data" Technical Report AIM-1625 (1998) describe several statistical models for co-occurrence data and relevant hierarchical clustering algorithms. They specifically address the Information Retrieval issues and term relationships.

The following example will clarify the difference between the present invention and prior hierarchical clustering work. Suppose a user performs a web search for "biology" and retrieves 20 documents, all of them general biology "hub" pages. Each page is somewhat similar in that they do not focus on a specific aspect of biology. Hierarchical clustering would divide the 20 documents into sub-clusters, where each sub-cluster would represent the "children" concepts. The topmost cluster could arguably be considered the "self" cluster. However, given the sub-clusters, there is no easy way to discern which features (words or phrases) are meaningful names. Is "botany" a better name for a sub-cluster than "university"? In addition, given a group of similar documents, the clustering may not be meaningful. The sub-clusters could focus on irrelevant aspects—such as the fact that half of the documents contain the phrase "copyright 2002", while the other half do not. This is especially difficult for web pages that are lacking of textual content, i.e. a "welcome page", or if some of the pages are of mixed topic (even though the cluster as a whole is primarily about biology).

In accordance with the teachings of the present invention, the set of the 20 documents would be analyzed (considering the web structure to handle non-descriptive pages) and a histogram summarizing the occurrence of each feature would be generated (the word frequencies in individual documents would be removed). As used herein, a feature refers to any term or n-gram (single word or phrase). A feature can also be structural information, general properties of a document, or other meaningful descriptions. Structural information may include a word or phrase in the title of a document or it may be a word or phrase in the metatags of a document, and the like. General properties of a document may include factors such as "this is a recent document" or document classifications, such as "news" or "home page". Such features are typically binary. An analysis of the features in the generated histogram with an analysis of the features in a histogram of all documents (or some larger reference collection) results in identification that the "best" name for the cluster is "biology" and that "science" is a term that describes a more general concept. Likewise, several different "types" of biology would be identified, even though there may be no documents in the set that would form a cluster about the different types. Examples are, "botany", "cell biology", "evolution", and the like. Phrases such as "copyright 2002" would be known to be unimportant because of their frequency in the larger collection. In addition, the use of web structure (extended anchortext which is described below) can significantly improve the ability to name small sets of documents compared to only using the document full text, thereby addressing the problems of non-descriptive pages, for example, "welcome pages". The histogram of the collection set of documents once created is used in conjunction with any positive set of documents, so long as the collection set is unchanged. That is, the histogram of the collection set of documents may be reused for many different positive sets of documents, as contrasted with regenerating a histogram of the collection set for each positive set.

The present invention provides a method of obtaining a statistical model for predicting parent, child and self features for a relatively small cluster of documents.

SUMMARY OF THE INVENTION

According to the present invention, a statistical model is created for inferring hierarchical term relationships about a topic, using only a small set of sample web pages related to the topic, without prior knowledge of any hierarchical information.

The statistical model forming the present invention can utilize either the full-text of the pages in the clusters or the context of the inbound links to the pages.

A principal object of the present invention is therefore, the provision of a method of relating and labeling various automatically generated clusters that is useful for a web directory or to improve information retrieval.

Another object of the present invention is the provision of a method for creating a statistical model for inferring hierarchical term relationships about a topic from a small set of web pages or set of documents related to the topic without prior knowledge of any hierarchical information.

A further object of the present invention is the provision of a method for distinguishing between parent, self and child features in a set of documents.

A still further object of the present invention is the provision of a method for distinguishing between parent, self and child features in a set of documents for providing recommendations of broader and/or narrower search terms in an information retrieval system.

A yet further object of the present invention is the provision of a method for distinguishing between parent, self and child features in a set of documents for automatically labeling web directories.

Further and still other objects of the present invention will become more clearly apparent when the following description is read in conjunction with the accompanying drawings.

DETAILED DESCRIPTION

Automatic selection of parent, self and child features can be useful for several purposes including automatic labeling of web directories or improving information retrieval. Another important use could be for automatically naming generated clusters, as well as recommending more general and more specific concepts, using only the summary statistics of a cluster and background collection statistics.

It is possible to distinguish between parent, self and child features based on an analysis of the frequency of a feature f in a set of documents (the "positive cluster"), compared to the frequency of feature f in the entire collection of documents, sometimes referred to as the negative set. Specifically, if f is very common in the positive cluster, but relatively rare in the collection, then f may be a good self term. A feature that is common in the positive cluster, but also somewhat common in the entire collection, is a description of the positive cluster, but is more general and hence may be a good parent feature. Features that are somewhat common in the positive cluster, but very rare in the general collection, may be good child features because they only describe a subset of the positive documents.

The term "document" as used herein is understood to include, but is not limited to, a document as well as representations or proxies of a document, e.g. abstracts, summaries, anchor text, and the like. Documents forming either a positive set or a collection set may be obtained by submitting a query on the World Wide Web or any information retrieval system, using Web bookmarks, using the results of clustering methods including those other than those described in accordance with the teachings of the present invention, using preexisting hierarchies of documents, or any other method of obtaining documents. A positive set of documents or a collection set of documents might be a sampling of a larger set of documents, for example by using random URLs from an existing hierarchy as a collection set.

Figure 1:
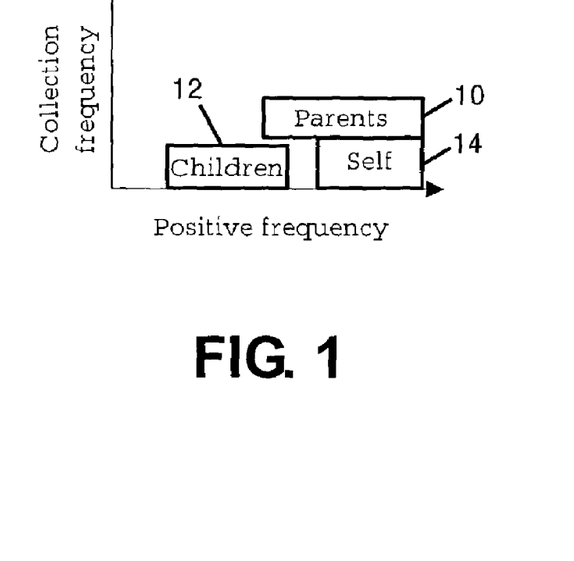
FIG. 1 is a graphical representation showing the predicted relationships between parent, child and self features.

Referring now to the figures and to FIG. 1 in particular, there is shown a graphical representation of a predicted relationship between parent, child and self features. "Positive frequency" refers to the percentage or fraction of documents in the positive set that contain a given feature. "Collection frequency" refers to the overall percentage or fraction of documents in the collection that contain a given feature.

The three regions illustrated by rectangular boxes are the predicted relative relationships between parent features 10, child features 12 and self features 14. Features outside of the rectangular boxes are considered poor candidates for the classes of parent, child and self, and such features would be left unclassified. FIG. 1 does not show any absolute numerical boundaries, only the relative positions of the regions. The regions depend on the specific generality of the class. For example, for the cluster of "biology" the parent of "science" is relatively common, but for a cluster of documents about "gene sequencing", a parent of "DNA" may be more rare, and hence the boundary between parent and self would likely be closer to 0.

Figure 2:
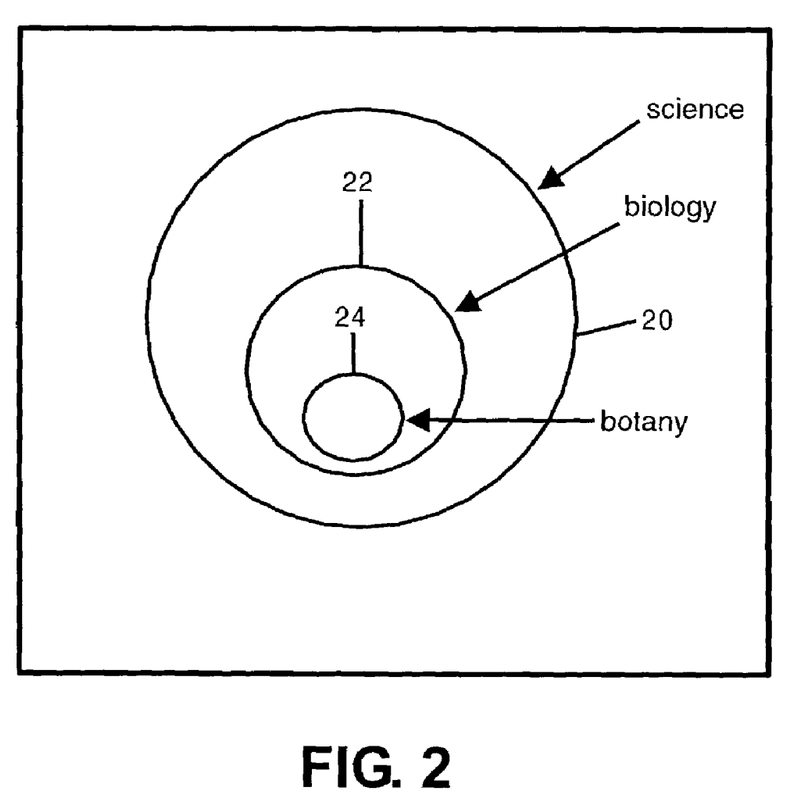
FIG. 2 is a sample distribution of features for the self feature of biology, parent feature of science and child feature of botany.

FIG. 2 shows a sample distribution of features for the self area of biology, parent area of science and child area of botany. The outer circle 20 represents the set of all documents in the set in the subject area of "science" in general. The middle circle 22 is the set of documents in the area of "biology" and the innermost circle 24 represents the documents in the area of "botany". If it is assumed that the features "science", "biology" and "botany" occur only within their respective circles, and occur in each document contained within their respective circles, the parent, child, self relationships are clear. From FIG. 2, roughly 20% of the total documents mention "science", about 5% of the documents mention "biology" and 1% mention "botany". Within the set of "biology" documents, 100% mention both "science" and "biology", while about 20% mention "botany".

This is a very simplistic representation, because it is assumed that every document in the biology circle actually contains the word biology—which is not necessarily the case. Likewise, it is unlikely that all documents in the sub-category of botany would mention both "biology" and "science".

To compensate for any eventuality, assume that there is some probability a given "appropriate" feature will be used. This probability is usually less for the parents than for the selfs or children. As a result, in FIG. 1, the parent region extends more to the left than the self region. The probability of a given feature being used will also affect the coordinates of the lower right corner; a lower probability shifts the percentage of occurrences in the self to the left. A probability of one would correspond to every positive document in the positive set containing all self features.

In order to test the model described in FIG. 1, ground truth data and known positive documents were used to generate a graph of the actual occurrences of parent, self and child features. The Open Directory (http://www.dmoz.org/) was chosen to form the collection set and the sets of documents for which hierarchical descriptions are to be inferred. Using the top level categories of "computers", "science" and "sports", the top 15 subject-based sub-categories from each category were chosen (science only had 11 subject-based sub-categories) for a total of 41 Open Directory categories to form the sets of documents, Si, where i corresponds to the different categories, for which hierarchical descriptions are to be inferred. Table 1 lists the 41 Open Directory categories that were used for the experiment and their three parent categories. Documents were randomly chosen from anywhere in the Open Directory to collect an approximation of the collection frequency of features, these documents form the set C. The same set C was used for all of the experiments.

TABLE 1

| Parent | Categories |
| --- | --- |
| Science | Agriculture, Anomalies and Alternative Science, Astronomy, Biology, Chemistry, Earth Sciences, Environment, Math, Physics, Social Sciences, Technology |
| Computers | Artificial Intelligence, CAD, Computer Science, Consultants, Data Communications, Data Formats, Education, Graphics, Hardware, Internet, Multimedia, Programming, Security, Software, Systems |
| Sports | Baseball, Basketball, Cycling, Equestrian, Football, Golf, Hockey, Martial Arts, Motorsports, Running, Skiing, Soccer, Tennis, Track and Field, Water Sports |

Each category has an assigned parent (in this case either science, computers or sports), an associated name, which formed the self features, and several sub-categories, which formed the children. In each case, we split the assigned names on "and", "or" or punctuation such as a comma. Thus, the category of "Anomalies and Alternative Science" becomes two selfs, "anomalies" and "alternative science".

The first part of the experiment considered an initial set of 500 random documents from each category to form the $S_i$ sets, and 20,000 random documents from anywhere in the directory as the set C (collection statistics). Each of the web URLs was downloaded and the features were put into a histogram. If a URL resulted in a terminal error, the page was ignored, explaining the variation in the number of documents in the set $S_i$ used for training. Features consisted of words or two or three word phrases, with each feature counting a maximum of once per document.

Then, for each category, each parent, child and self feature (as assigned by the Open Directory) was graphed with the X coordinate as the fraction of documents in set $S_i$ containing the feature, and the Y coordinate as the fraction of the documents in set C (random documents) containing that feature. If a feature occurred in less than 2% of the set $S_i$, the feature was ignored.

Figure 3:
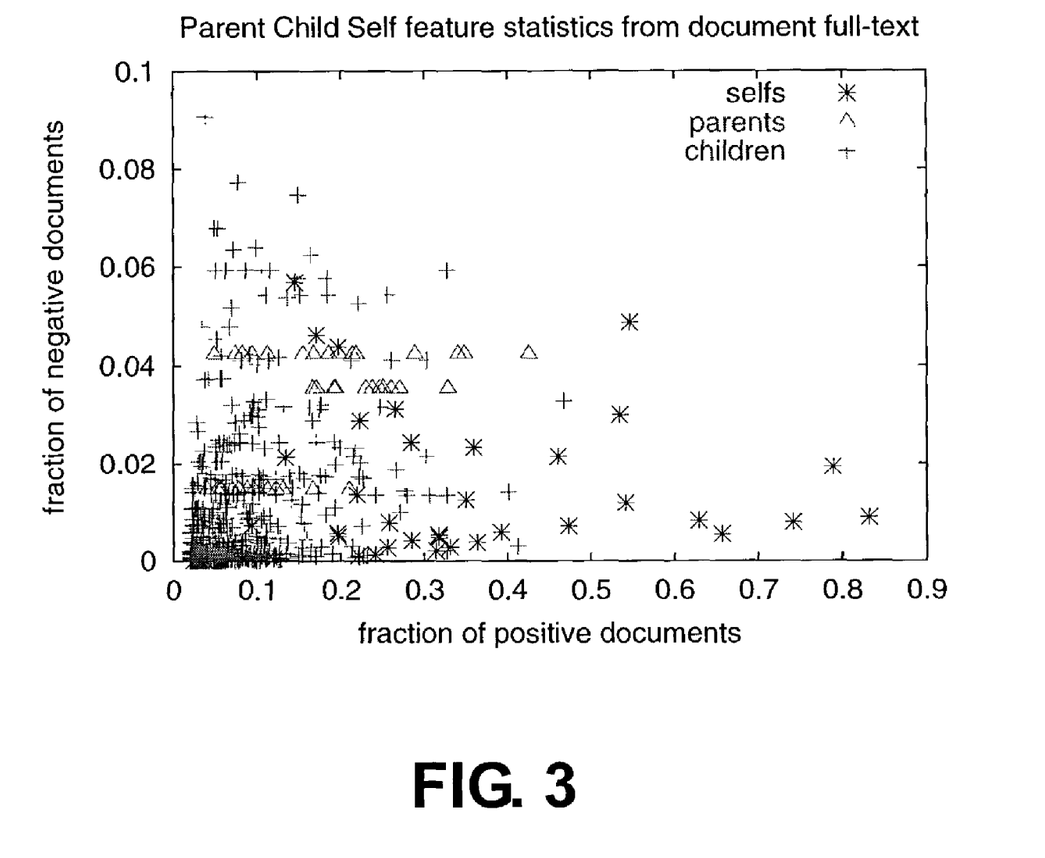
FIG. 3 is a graph of the distribution of ground truth features from the Open Directory.

FIG. 3 shows the distribution of all parent, child and self features from the 41 categories. Although there appears to be a general trend, there are many children that occur near the parents. Since there were many categories with the same parent (only three unique parents), and a common set C was used, the parents are co-linear with a common Y-axis value.

Several of the children are words or phrases that are not well defined in the absence of knowledge of the category. For example, the feature "news" is undefined without knowing the relevant category, is it news about artificial intelligence, or news about baseball? Likewise several features, including news, are not "subjects" but rather a non-textual property of a page. The list of categories and their children were manually examined and any child that was not sufficiently defined in isolation was removed. More than half of the children were removed in this manner. The removal was done prior to seeing any data, and without knowledge of exactly why "insufficiently defined" words or phrases were being removed.

Figure 4:
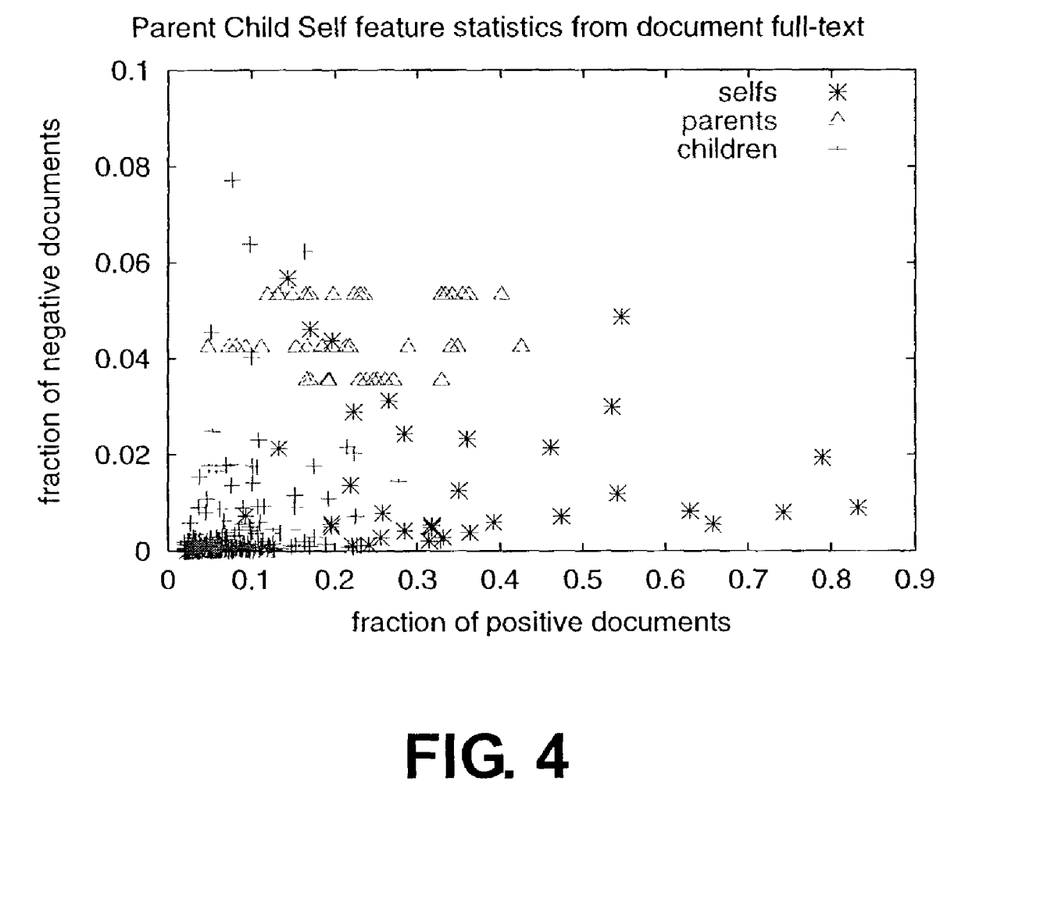
FIG. 4 is a graph similar to that in FIG. 3 except the parent was changed from "computers" to "computer", and several of the sub-categories that are not defined without knowledge of the parent, i.e. "news" or "resources" were removed.

An analysis of the data suggested that the parent of "computers" should be replaced by "computer". Unlike the word "sports" often found in the plural when used in the general sense, "computers" is often found in the singular form. Stemming or stopword removal was not performed, so that "computers" and "computer" are different features. FIG. 4 shows the same data as FIG. 3 except with the parent changed from "computers" to "computer" and the insufficiently defined children removed. That is, several sub-categories that are not defined without knowledge of the parent, for example "news" or "resources", were removed. This change produces a clearer separation between the parent, self and child regions. The insufficiently defined children that were removed generally form a fourth class of features. Referring to FIG. 1, this fourth class of features is usually located to the left of the parent cluster and above the child cluster.

Documents often do not contain the words that describe their "category". In the category of "Multimedia" for example, the feature "multimedia" occurred in only 13% of the positive documents. This is due to a combination of choice of terms by the page authors as well as the fact that often a main web page has no textual contents, and is represented by only a "click here to enter" image.

Figure 5:
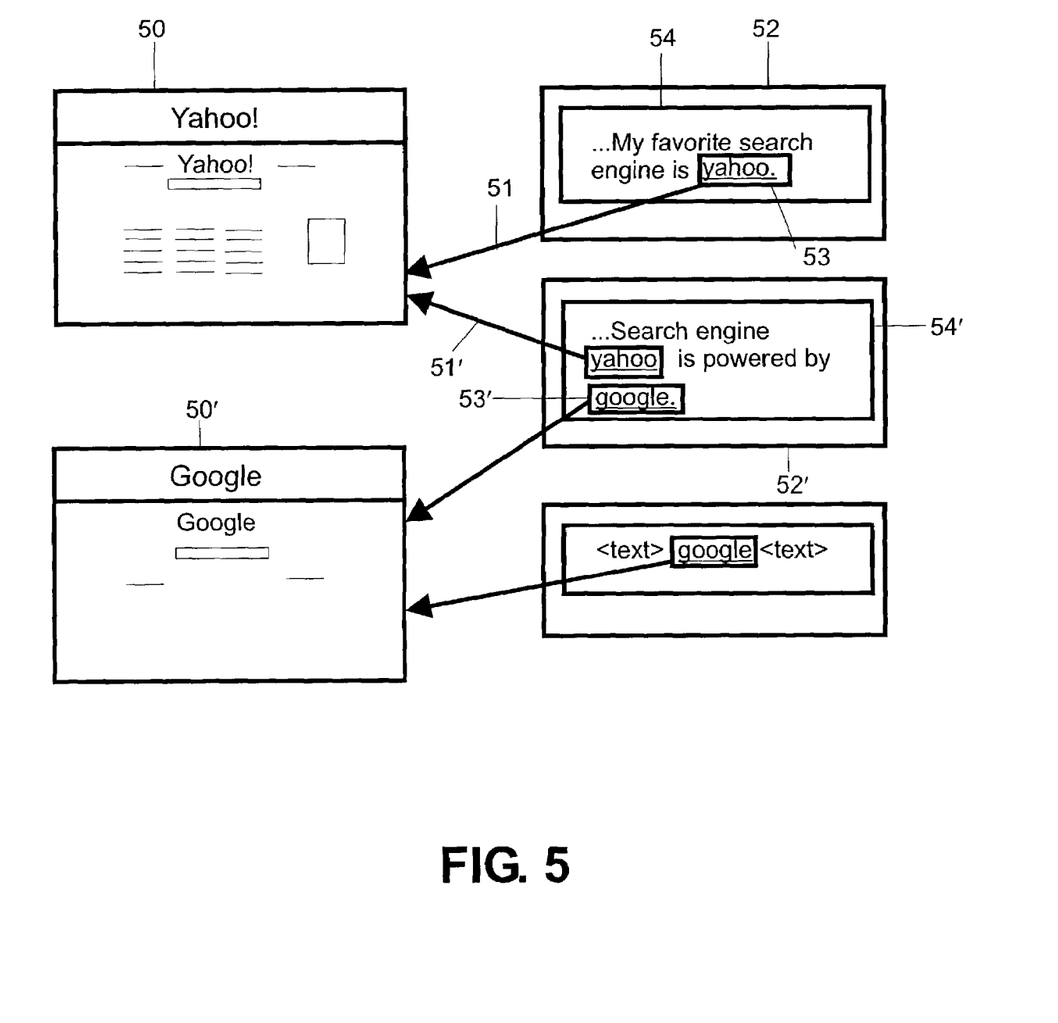
FIG. 5 is a schematic representation of extended anchor-text.

The model assumes the "documents" are actually descriptions. Rather than use the words on the page itself, the experiment was repeated using what will be referred to as "extended anchortext", as shown in FIG. 5. In Glover et al., supra, which is incorporated herein by reference, there is a description of extended anchortext, and how it produces features more consistent with the "summary" rather than the full-text of documents. Features found using extended anchortext generate clusters which appear to produce more reasonable names.

Extended anchortext refers to the words that occur near a link to the target page, that is, a word in close proximity to an inbound link. FIG. 5 shows schematically an example of extended anchortext. Instead of using the full-text, a virtual document composed of up to 15 extended anchortexts was used. Inbound links from Yahoo or The Open Directory were excluded. When using virtual documents created by considering up to 25 words before, after and including the inbound anchortexts, there is a significant increase in the usage of self features in the positive set of documents $S_i$ (as compared to the use of full-texts). In the category of Multimedia, the feature "multimedia" occurred in 42% of the positive virtual documents, as opposed to 13% of the full-texts. The occurrence of the feature "multimedia" in the documents in set C (the entire collection) was nearly identical for both the full-text and the virtual documents, at approximately 2%.

In FIG. 5, extended anchortext is determined from a first document or page 50, for example, yahoo.com or from a second document or page 50', for example, google.com. The inbound links 51, 51' from other documents 52, 52' into page 50 are found by any of a number of methods known to those skilled in the art. The anchor text 53, 53' are hyperlinks from other pages that point to the source pages 50 and 50'. Generally, the anchor text, in most conventional documents, is highlighted in blue font and is underlined in the document. Extended anchor text for the pages pointing to page 50 are the extended anchor texts 54, 54' including the hyperlink, and several words before and several words after the hyperlink. In the case of document 52 the extended anchor text 54 is "My favorite search engine is yahoo." In document 52' the extended anchor text 54' for the document 50 is " . . . Search engine yahoo is powered by google."

In the former case the extended anchor text ends at the end of the text at the word "yahoo". In the latter case the word "yahoo" occurs in the middle of the extended anchor text.

The inclusion of text surrounding the inbound link provides context and meaning to the page that it is linked to.

Starting with a set of pages that are all identified as "positive" (i.e., a single cluster about one topic), then one at a time, each page of the positive set is examined and pages that link to that page of the positive set are identified. In the examples above, www.yahoo.com was a positive page and the first page that links to "yahoo" provides some indication of what the topic of page www.yahoo.com concerns by looking at the words "near" the link to "yahoo". The link may be from any page, not necessarily a search engine such as Yahoo. The same procedure is repeated for each page of the collection set.

All of the extended anchor texts found for the same source document are placed together to form a virtual document (not shown).

Table 2 lists the number of virtual documents used for each category (randomly picked from the 500 used in the first experiment) for the full-text (F-column) experiment and for the extended anchor text (V-column) experiment. A total of 743 virtual documents were used as the document set C. The generation of virtual documents is quite expensive, forcing a reduction of the total number of pages considered. The improved summarization ability from virtual documents should allow the process to operate with fewer total documents.

TABLE 2

| Category | F | V | Category | F | V |
|---|---|---|---|---|---|
| Agriculture | 438 | 67 | Anomalies and alternative science | 395 | 63 |
| Artificial intelligence | 448 | 77 | Astronomy | 438 | 64 |
| Baseball | 419 | 62 | Basketball | 418 | 67 |
| Biology | 454 | 66 | Cad | 405 | 65 |
| Chemistry | 443 | 70 | Computer science | 346 | 75 |
| Consultants | 442 | 139 | Cycling | 438 | 65 |

TABLE 2-continued

| Category | F | V | Category | F | V |
|---|---|---|---|---|---|
| Data communications | 439 | 65 | Data formats | 434 | 62 |
| Earth sciences | 445 | 70 | Education | 436 | 67 |
| Environment | 439 | 76 | Equestrian | 433 | 62 |
| Football | 426 | 71 | Golf | 441 | 64 |
| Graphics | 454 | 69 | Hardware | 451 | 67 |
| Hockey | 411 | 70 | Internet | 446 | 74 |
| Martial arts | 461 | 61 | Math | 460 | 69 |
| Motorsports | 445 | 64 | Multimedia | 427 | 64 |
| Physics | 441 | 69 | Programming | 446 | 76 |
| Running | 436 | 82 | Security | 426 | 67 |
| Skiing | 421 | 69 | Soccer | 439 | 73 |
| Social sciences | 458 | 71 | Software | 446 | 73 |
| Systems | 447 | 54 | Technology | 439 | 53 |
| Tennis | 452 | 36 | Track and field | 384 | 60 |
| Water sports | 451 | 40 | | | |

Figure 6:
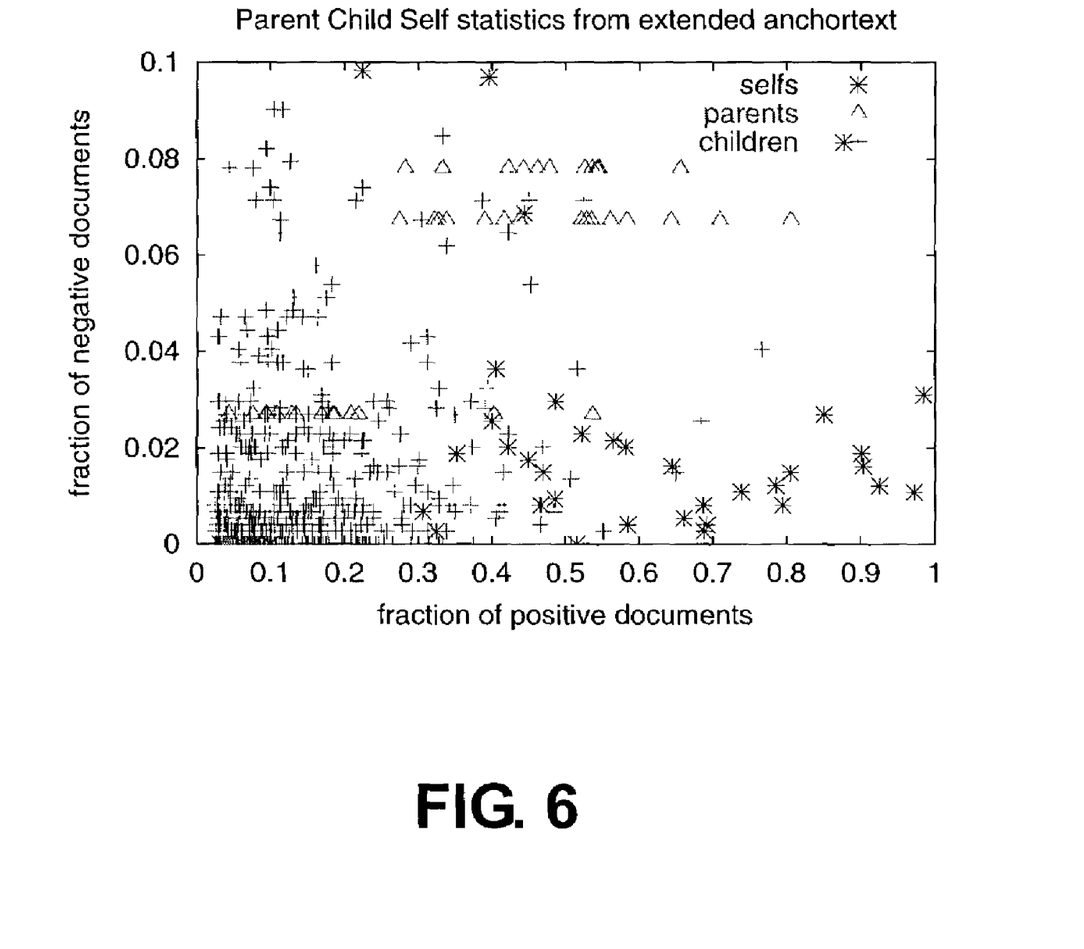
FIG. 6 is a graph of ground truth features from the Open Directory using extended anchortext virtual documents instead of full-text.
Figure 7:
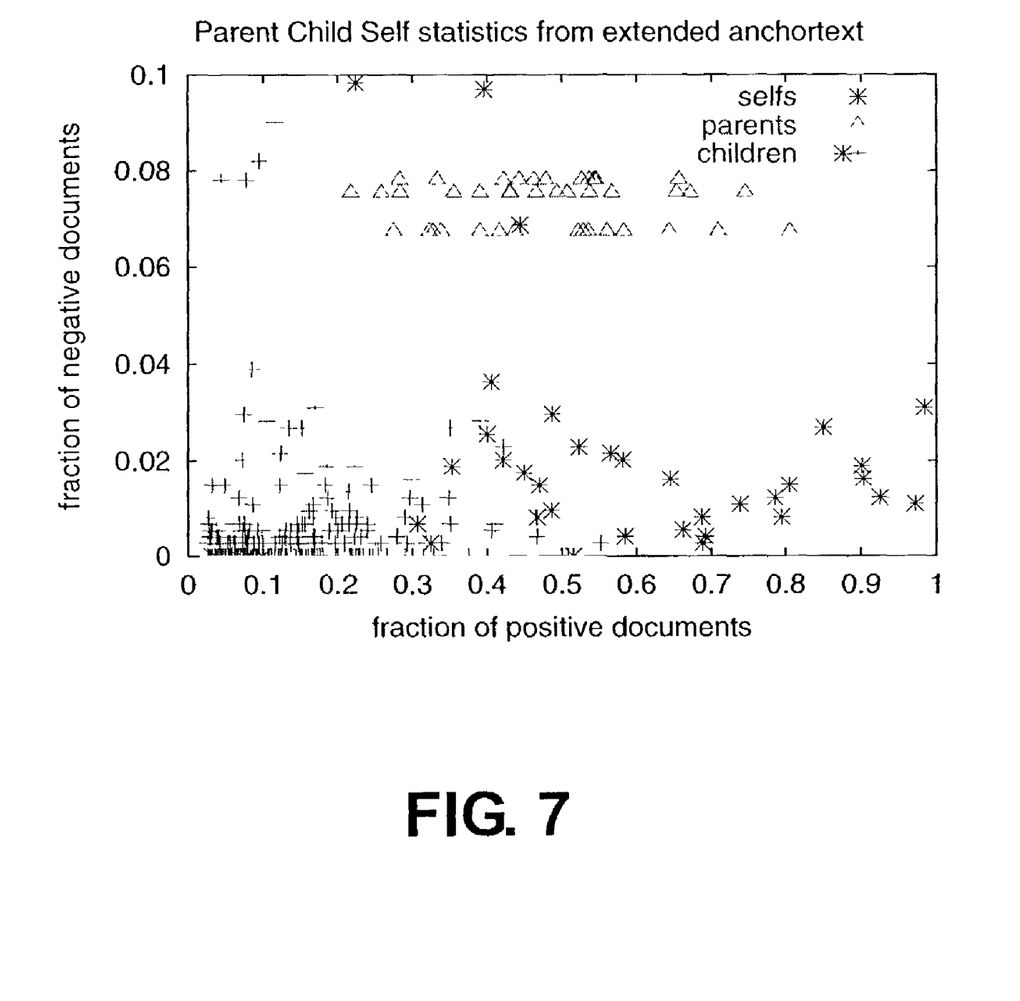
FIG. 7 is a graph of ground truth features from the Open Directory using extended anchortext virtual documents instead of full-text, with the parent changed from "computers" to "computer" and insufficiently defined children removed.

FIG. 6 shows the results for all parent, children and self features for the extended anchortext. The percentages of documents in the positive set $S_i$ have in general shifted to the right, as selfs become more clearly separated from children. FIG. 7 shows the results after removal of the insufficiently defined children and replacing "computers" with "computer". Very few data points fall outside of a simple rectangular region defined around each class.

Even though most parents, children, and selfs fall into the regions shown, the results can be improved by performing stemming of the features. For example, some features may appear in both singular and plural forms, with one form appearing as a false child. In addition, phrases may occur less often than their individual terms, making selfs appear falsely as children, such as in the case for "artificial intelligence", where the phrase "artificial intelligence" appears as a child due to the relatively low occurrence of the phrase.

FIG. 7 shows that graphing of the ground-truth features from the Open Directory for the 41 categories in general follows the predicted model of FIG. 1, however, the model does not graph all features occurring in each category, only features assigned by The Open Directory are graphed. The validity of the model is strengthened by using an algorithm that ranks all features as possible parents, children and selfs, and compares the output with the ground-truth data from the Open Directory.

Begin with a group of documents which may be query results, documents resulting from a clustering operation, a list of bookmarked documents or manually selected documents. If the documents comprise web pages or other hyperlinked document collections, preferably virtual documents are created for each page as described above. If there are documents that are not hyperlinked, full-text versions of the documents may be used. Then, the following algorithm is applied. A ranking is performed of the results. While many rankings are possible, the preferred ranking relies on the ranking based on the highest percentage of documents containing the feature. Table 3 shows the top two ranked self features in each category, where the ranking was based on the percentage of documents in the positive set containing the feature.

Predict Parents, Children and Selfs Algorithm

For each feature f from a set of desired features:
1: Assign a label to feature f as follows:
if (f.C>maxParentC){Label='N'}
elseif (f.C>maxSelfC){Label='P'}
elseif (f.$S_i$>minSelf$S_i$){Label='S'} elseif ((f.$S_i$<maxChildS$_i$)  and  (f.C<maxChildC))
    {Label='C'}
else {Label='N'}

2: For each label (P,S,C) sort each feature f with that label by f.$S_i$.

Using the data from FIG. 7, specify the following cutoffs:
maxParentC=0.08
maxSelfC=0.06
minSelfS$_i$=0.4
maxChildS$_i$=0.4
maxChildC=0.02

$S_i$ is the set of documents from which hierarchical descriptions are to be inferred, C is the collection set of documents, f.C is the fraction of the documents in the collection set of documents C containing the feature f, and f.$S_i$ is the fraction of the documents in the set of positive documents Si containing the feature f.

The preferred algorithm above is most useful when the self, parent and child regions are rectangular and connected as shown in FIG. 1. If the regions are desired to be disconnected and/or overlapping and/or non-rectangular, the algorithm may be modified accordingly by one skilled in the art.

Table 3 shows the top parents, top selfs and top children features for each of the 41 tested categories using the Predict Parents, Children and Selfs Algorithm. A blank entry means that no terms or features fall into the specified region for that category. The results show that in all 41 categories the Open Directory assigned parent (replacing "computer" for "computers") was ranked in the top 5. In about 80% of the categories the top ranked selfs were identical, or effectively the same (synonym, or identical stem) as the Open Directory assigned self. Children are more difficult to evaluate since there are many reasonable children that are not listed.

TABLE 3

| Category | Parents | Selfs | Children |
|---|---|---|---|
| Agriculture | management, science | agriculture, agricultural | soil, sustainable, crop |
| Anomalies and Alternative science | articles, science | | alternative, ufo, scientific |
| Artificial intelligence | systems, computer | artificial, intelligence | ai, computational, artificial intelligence |
| Astronomy | science, images | space, astronomy | physics, sky, astronomical |
| Baseball | sports, high | baseball, league | stats, players, leagues |
| Basketball | sports, college | basketball, team | s basketball, espn, hoops |
| Biology | science, university of | biology | biological, genetics, plant |
| Cad | systems, computer | cad, 3d | modeling, architectural, 2d |
| Chemistry | science, university of | chemical, chemistry | chem, scientific, of chemistry |
| Computer science | systems, computer | engineering, computing | programming, papers, theory |
| Consultants | systems, management | solutions, consulting | consultants, programming, and web |
| Cycling | sports, url | bike, bicycle | bicycling, mtb, mountain bike |
| Data communications | systems, management | communications, solutions | networks, clients, voice |
| Data formats | collection, which | windows, graphics | file, mac, truetype |
| Earth sciences | science, systems | environmental, data | survey, usgs, ecology |
| Education | computer, training | learning | Microsoft, tutorials, certification |
| Environment | science, management | environmental, environment | conservation, sustainable, the environment |
| Equestrian | training, sports | horse, equestrian | riding, the horse, dressage |
| Football | sports, board | football, league | teams, players, leagues |
| Golf | sports, equipment | golf, courses | golfers, golf club, golf course |
| Graphics | images, collection | graphics | 3d, animation, animated |
| Hardware | computer, systems | hardware, technologies | hard, components, drives |
| Hockey | sports, Canada | hockey, team | hockey league, teams, ice hockey |
| Internet | computer, support | | web based, rfc, hosting |
| Martial arts | arts, do | martial, martial arts | fu, defense, kung fu |
| Math | science, university of | math, mathematics | theory, geometry, algebra |
| Motorsports | photos, sports | racing, race | driver, track, speedway |
| Multimedia | media, video | digital, flash | 3d, animation, graphic |
| Physics | science, university of | physics | scientific, solar, theory |
| Programming | systems, computer | security, system | securitend, nt, encryption |
| Running | sports, training | running, race | races, track, athletic |
| Security | systems, computer | Security, system | security and, nt, encryption |
| Skiing | sports, country | ski, skiing | winter, snowboarding, racing |
| Soccer | sports, url | soccer, league | teams, players, leagues |
| Social sciences | science, university of | social | economics, theory, anthropology |
| Software | systems, computer | windows, system | application, tool, programming |
| Systems | computer, systems | computers, hardware | linux, emulator, software and |
| Technology | systems, university of | engineering | scientific, engineers, chemical |
| Tennis | sports, professional | tennis, s tennis | men s, women s tennis, of tennis |
| Track and field | sports, training | running, track | track and field, track and, and field |
| Water sports | board, sports | boat | sailing, boats, race |

Improvements to the algorithm are possible. First, in some categories, such as "Internet", the cut-off points vary. The algorithm does not dynamically adjust to the data for a given category. Also, the algorithm requires knowing the boundary points. Second, phrases sometimes have a lower positive occurrence than single words. For example, the phrase "artificial intelligence" incorrectly appears as a child instead of a self. Third, there is no stemming or intelligent feature removal. For example, a feature such as "university of" should be ignored since it ends with a stop word. Likewise, consulting as opposed to consult, or computers as opposed to computer are all examples where a failure to stem causes errors. Another improvement is to apply a threshold for automatically removing features that are not efficient. As noted above, the algorithm may be changed if non-rectangular regions are desired or if the regions are overlapping or if the regions are not connected.

The described invention is not restricted to English language texts. Almost any language, including Japanese can be used. The following listing shows the results of applying the Predict Parents, Children and Selfs Algorithm using the full text from web pages in the Japanese language from the category of Japanese Universities. The features extracted were the Japanese words and not the English translations.

The following data was collected by using 432 "random" web pages (in Japanese) and 367 Japanese University pages (also in Japanese): The top ranked parents: 年度—year, 学校—school, 学—study Top ranked selfs: 大学—university, 入試—admission examination Top ranked children: 学生—student, 学科—subject, 入学—entrance, 科—course, 図書館—library, キャンパス—campus, 学部—department, 学内—inside the university, 施設—facility, 大学院—graduate school The cutoff values used for applying the Predict Parents, Children and Selfs Algorithm were approximately: maxParentC:=0.05; maxSelfC=0.04; minSelfS$_i$=maxChildS$_i$=: 0.35; maxChildC=0.03.

The invention is also not limited solely to text documents. The invention is applicable to non-textual data including, but not limited to, multimedia data, audio data, image data, video data and the like where there are features capable of being identified. If a URL, link, or other source of text, such as a citation, reference, closed captioning or the like is available for the non-textual data, then extended anchor text methodology can be used. If a URL or link is not available, then general features to describe the non-textual data can be used. Any interlinking system between documents where a source has information about a target, e.g. citation references, can be used instead of URLs.

By using these methods a searcher can easily name and relate clusters of documents. A searcher may benefit by automatically being recommended alternative queries that are more general or more specific than a previous query. A set of results for a query can be expanded based on the predicted hierarchy. For example, a user searches for the term "biology" and receives a recommendation that the term "science" is more general than the term "biology", and the term "botany" is more specific than the term "biology". Likewise, a user who selects several pages that are related, for example, the homepages of MSN, Prodigy, and AT&T Worldnet can see that these pages should be named "Internet service providers".

In summary, a method for creating a statistical model has been described and illustrated for predicting parent, child and self features for a relatively small cluster of documents. Self features are useable as a recommended name for a cluster, while parent and children features can be used to "place" the cluster in the space of the larger collection. Parent features suggest a more general concept while children features suggest concepts that describe a specialization of the self. Experimental tests of graphing ground truth data confirmed actual parent, child and self features generally followed the model. An algorithm is disclosed which is capable of predicting parent, child and self features from feature histograms. The predicted features often agreed with the ground truth, and suggested new interconnections between related categories.

While there has been described and illustrated preferred methods of inferring hierarchical descriptions from a set of documents without prior knowledge of hierarchical information, it will be apparent to those skilled in the art that further modifications and variations are possible without deviating from the spirit and broad scope of the invention which shall be limited solely by the scope of claims appended hereto.

What is claimed is:

1. A method of inferring hierarchical descriptions of a set of documents comprising the steps of:
   providing a first histogram of features from a positive set of documents;
   providing a second histogram of features from a collection set of documents; and
   determining whether each feature is a self feature, a parent feature or a child feature based on the fraction of the documents in the positive set containing the feature and the fraction of the documents in the collection set containing the feature.

2. A method of inferring hierarchical descriptions of a set of documents as set forth in claim 1, further comprising the steps of setting a histogram threshold and removing features which are below the threshold in both the first histogram and the second histogram.

3. A method of inferring hierarchical descriptions of a set of documents as set forth in claim 1, further comprising ranking the features by order of occurrences in the positive set of documents.

4. A method of inferring hierarchical descriptions of a set of documents as set forth in claim 1, wherein a document comprises image data.

5. A method of inferring hierarchical descriptions of a set of documents as set forth in claim 1, wherein a document comprises text data.

6. A method of inferring hierarchical descriptions of a set of documents as set forth in claim 5, wherein the text data is in a language other than English.

7. A method of inferring hierarchical descriptions of a set of documents as set forth in claim 1, wherein a document comprises audio data.

8. A method of inferring hierarchical descriptions of a set of documents as set forth in claim 1, wherein a document comprises multimedia data.

9. A method of inferring hierarchical descriptions of a set of documents as set forth in claim 1, wherein said determining is performed using Predict Parents, Children and Selfs Algorithm.

10. A method of inferring hierarchical descriptions of a set of documents as set forth in claim 9, further comprising the steps of setting a histogram threshold and removing features which are below the threshold in both the first histogram and the second histogram.

11. A method of inferring hierarchical descriptions of a set of documents as set forth in claim 9, further comprising ranking the features by order of occurrences in the positive set of documents.

12. A method of inferring hierarchical descriptions of a set of documents as set forth in claim 9, wherein a document comprises image data.

13. A method of inferring hierarchical descriptions of a set of documents as set forth in claim 9, wherein a document comprises text data.

14. A method of inferring hierarchical descriptions of a set of documents as set forth in claim 13, wherein the text data is in a language other than English.

15. A method of inferring hierarchical descriptions of a set of documents as set forth in claim 9, wherein a document comprises audio data.

16. A method of inferring hierarchical descriptions of a set of documents as set forth in claim 9, wherein a document comprises multimedia data.

17. A method of inferring hierarchical descriptions of a set of documents comprising web pages comprising the steps of:
   obtaining a first set of URLs comprising a positive set of documents;
   obtaining a second set of URLs comprising a collection set of documents;
   determining in-bound links for each URL in the first set of URLs and for each URL the second set of URLs;
   creating a virtual document for each URL in the positive set of documents and a virtual document for each URL in the collection set of documents;
   providing a first histogram of features from the virtual documents associated with the first set of URLs;
   providing a second histogram of features from the virtual documents associated with the second set of URLs; and
   determining whether each feature is a self feature, a parent feature or a child feature based on the fraction of the virtual documents associated with the positive set of documents containing the feature and the fraction of the virtual documents associated with the collection set of documents containing the feature.

18. A method of inferring hierarchical descriptions of a set of documents as set forth in claim 17, further comprising the steps of setting a histogram threshold and removing features which are below the threshold in both the first histogram and the second histogram.

19. A method of inferring hierarchical descriptions of a set of documents as set forth in claim 17, further comprising ranking the features by order of occurrences in the positive set of documents.

20. A method of inferring hierarchical descriptions of a set of documents as set forth in claim 17, wherein a URL points to a page that contains image data.

21. A method of inferring hierarchical descriptions of a set of documents as set forth in claim 17, wherein a URL points to a page that contains text data.

22. A method of inferring hierarchical descriptions of a set of documents as set forth in claim 21, wherein the text data is in a language other than English.

23. A method of inferring hierarchical descriptions of a set of documents as set forth in claim 17, wherein a URL points to a page that contains audio data.

24. A method of inferring hierarchical descriptions of a set of documents as set forth in claim 17, wherein a URL points to a page that contains multimedia data.

25. A method of inferring hierarchical descriptions of a set of documents comprising web pages as set forth in claim 17, wherein said determining whether each feature is a self feature, a parent feature or a child feature is performed using Predict Parents, Children and Selfs Algorithm.

26. A method of inferring hierarchical descriptions of a set of documents as set forth in claim 25, further comprising the steps of setting a histogram threshold and removing features which are below the threshold in both the first histogram and the second histogram.

27. A method of inferring hierarchical descriptions of a set of documents as set forth in claim 25, further comprising ranking the features by order of occurrences in the positive set of documents.

28. A method of inferring hierarchical descriptions of a set of documents as set forth in claim 25, wherein a URL points to a page that contains image data.

29. A method of inferring hierarchical descriptions of a set of documents as set forth in claim 25, wherein a URL points to a page that contains text data.

30. A method of inferring hierarchical descriptions of a set of documents as set forth in claim 29, wherein the text data is in a language other than English.

31. A method of inferring hierarchical descriptions of a set of documents as set forth in claim 25, wherein a URL points to a page that contains audio data.

32. A method of inferring hierarchical descriptions of a set of documents as set forth in claim 25, wherein a URL points to a page that contains multimedia data.

33. A method of searching an information retrieval system using inferential hierarchical descriptions of a set of documents comprising the steps of:
   submitting a search query to an information retrieval system;
   retrieving a first set of documents from the information retrieval system responsive to the search query;
   providing a second set of documents;
   determining in-bound links for each retrieved document in the first set documents and for each documents in the second set of documents;
   creating a virtual document for each document in the first set of documents and for each document in the second set of documents;
   creating a first histogram of features in the virtual documents associated with the first set of documents;
   creating a second histogram of features in the virtual documents associated with the second set of documents;
   determining whether each feature is a self feature, a parent feature or a child feature based on the fraction of the virtual documents associated with the positive set of documents containing the feature and the fraction of the virtual documents associated with the collection set of documents containing the feature; and
   changing the search query responsive to the classification of a feature.

34. A method of searching an information retrieval system using inferential hierarchical descriptions of a set of documents as set forth in claim 33, further comprising the steps of setting a histogram threshold and removing features which are below the threshold in both the first histogram and the second histogram.

35. A method of searching an information retrieval system using inferential hierarchical descriptions of a set of documents as set forth in claim 33, further comprising ranking the features by order of occurrences in the first set of documents.

36. A method of searching an information retrieval system using inferential hierarchical descriptions of a set of documents as set forth in claim 33, wherein the search query is changed to a parent feature to broaden the search scope.

37. A method of searching an information retrieval system using inferential hierarchical descriptions of a set of documents as set forth in claim 33, wherein the search query is changed to a child feature to narrow the search scope.

38. A method of searching an information retrieval system using inferential hierarchical descriptions of a set of documents as set forth in claim 33, wherein a document comprises image data.

39. A method of searching an information retrieval system using inferential hierarchical descriptions of a set of documents as set forth in claim 33, wherein a document comprises text data.

40. A method of searching an information retrieval system using inferential hierarchical descriptions of a set of documents as set forth in claim 39, wherein the text data is in a language other than English.

41. A method of searching an information retrieval system using inferential hierarchical descriptions of a set of documents as set forth in claim 33, wherein a document comprises audio data.

42. A method of searching an information retrieval system using inferential hierarchical descriptions of a set of documents as set forth in claim 33, wherein a document comprises multimedia data.

43. A method of searching an information retrieval system using inferential hierarchical descriptions of a set of documents as set forth in claim 33, wherein said determining whether each feature is a self feature, a parent feature or a child feature is performed using Predict Parents, Children and Selfs Algorithm.

44. A method of searching an information retrieval system using inferential hierarchical descriptions of a set of documents as set forth in claim 43, further comprising the steps of setting a histogram threshold and removing features below the threshold in both the first histogram and the second histogram.

45. A method of searching an information retrieval system using inferential hierarchical descriptions of a set of documents as set forth in claim 43, further comprising ranking the features by order of occurrences in the first set of documents.

46. A method of searching an information retrieval system using inferential hierarchical descriptions of a set of documents as set forth in claim 43, wherein the search query is changed to a parent feature to broaden the search scope.

47. A method of searching an information retrieval system using inferential hierarchical descriptions of a set of documents as set forth in claim 43, wherein the search query is changed to a child feature to narrow the search scope.

48. A method of searching an information retrieval system using inferential hierarchical descriptions of a set of documents as set forth in claim 43, wherein a document comprises image data.

49. A method of searching an information retrieval system using inferential hierarchical descriptions of a set of documents as set forth in claim 43, wherein a document comprises text data.

50. A method of searching an information retrieval system using inferential hierarchical descriptions of a set of documents as set forth in claim 49, wherein the text data is in a language other than English.

51. A method of searching an information retrieval system using inferential hierarchical descriptions of a set of documents as set forth in claim 43, wherein a document comprises audio data.

52. A method of searching an information retrieval system using inferential hierarchical descriptions of a set of documents as set forth in claim 43, wherein a document comprises multimedia data.

53. A method of labeling a document directory using inferential descriptions of sets of documents comprising the steps of:
 (a) providing a hierarchy of sets of documents;
 (b) providing a collection set of documents;
 (c) determining in-bound links for each document in a set of documents in the hierarchy and for each document in the collection set of documents;
 (d) creating a virtual document for each document in the set of documents in the hierarchy and for each document in the collection set of documents;
 (e) creating a first histogram of features from the virtual documents associated with the set of documents in the hierarchy;
 (f) creating a second histogram of features from the virtual documents associated with the collection set of documents;
 (g) determining whether each feature is a self feature, a parent feature or a child feature based on the fraction of the virtual documents associated with the set of documents in the hierarchy containing the feature and the fraction of virtual documents associated with the collection set of documents containing the feature;
 (h) repeating steps (c) to (g) for each set of documents in the hierarchy of sets of documents; and
 (i) labeling the hierarchy of sets of documents responsive to the determining of each feature.

54. A method of labeling a document directory using inferential descriptions of sets of documents as set forth in claim 53, wherein said determining whether each feature is a self feature, a parent feature or a child feature is performed using Predict Parents, Children, and Selfs Algorithm.

55. A method of labeling a document directory using inferential descriptions of sets of documents comprising the steps of:
 (a) providing a hierarchy of sets of documents;
 (b) providing a collection set of documents;
 (c) creating a first histogram of features from each set of documents in the hierarchy;
 (d) creating a second histogram of features from the collection set of documents;
 (e) determining whether each feature is a self feature, a parent feature or a child feature based on the fraction of documents associated with the set of documents in the hierarchy containing the feature and the fraction of documents associated with the collection set of documents containing the feature;
 (f) repeating steps (c) to (e) for each set of documents in the hierarchy of sets of documents; and
 (g) labeling the hierarchy of sets of documents responsive to the determining of each feature.

56. A method of labeling a document directory using inferential descriptions of sets of documents as set forth in claim 55, wherein said determining whether each feature is a self feature, a parent feature or a child feature is performed using Predict Parents, Children, and Selfs Algorithm.

57. A method of inferring hierarchical descriptions of a set of documents comprising the steps of:
 obtaining a first set of documents comprising a positive set of documents;
 obtaining a second set of documents comprising a collection set of documents;

determining in-bound links for each document in the first set of documents and for each document in the second set of documents;

creating a virtual document for each document in the positive set of documents and a virtual document for each document in the collection set of documents;

providing a first histogram of features from the virtual documents associated with the first set of documents;

providing a second histogram of features from the virtual documents associated with the second set of documents; and determining whether each feature is a self feature, a parent feature or a child feature based on the fraction of the virtual documents associated with the positive set of documents containing the feature and the fraction of the virtual documents associated with the collection set of documents containing the feature.

58. A method of inferring hierarchical descriptions of a set of documents as set forth in claim 57, further comprising the steps of setting a histogram threshold and removing features which are below the threshold in both the first histogram and the second histogram.

59. A method of inferring hierarchical descriptions of a set of documents as set forth in claim 57, further comprising ranking the features by order of occurrences in the positive set of documents.

60. A method of inferring hierarchical descriptions of a set of documents as set forth in claim 57, wherein a document contains image data.

61. A method of inferring hierarchical descriptions of a set of documents as set forth in claim 57, wherein a document contains text data.

62. A method of inferring hierarchical descriptions of a set of documents as set forth in claim 61, wherein the text data is in a language other than English.

63. A method of inferring hierarchical descriptions of a set of documents as set forth in claim 57, wherein a document contains audio data.

64. A method of inferring hierarchical descriptions of a set of documents as set forth in claim 57, wherein a document contains multimedia data.

65. A method of inferring hierarchical descriptions of a set of documents as set forth in claim 57, wherein said determining whether each feature is a self feature, a parent feature or a child feature is performed using Predict Parents, Children and Selfs Algorithm.

66. A method of inferring hierarchical descriptions of a set of documents as set forth in claim 65, further comprising the steps of setting a histogram threshold and removing features which are below the threshold in both the first histogram and the second histogram.

67. A method of inferring hierarchical descriptions of a set of documents as set forth in claim 65, further comprising ranking the features by order of occurrences in the positive set of documents.

68. A method of inferring hierarchical descriptions of a set of documents as set forth in claim 65, wherein a document contains image data.

69. A method of inferring hierarchical descriptions of a set of documents as set forth in claim 65, wherein a document contains text data.

70. A method of inferring hierarchical descriptions of a set of documents as set forth in claim 69, wherein the text data is in a language other than English.

71. A method of inferring hierarchical descriptions of a set of documents as set forth in claim 65, wherein a document contains audio data.

72. A method of inferring hierarchical descriptions of a set of documents as set forth in claim 65, wherein a document contains multimedia data.

\* \* \* \* \*